Sept. 6, 1966          G. FALBEL          3,271,575

CATOPTRIC RADIOMETRIC DETECTOR

Filed Dec. 4, 1961

INVENTOR.
GERALD FALBEL
BY
ATTORNEY

3,271,575
CATOPTRIC RADIOMETRIC DETECTOR
Gerald Falbel, Stamford, Conn., assignor to Barnes Engineering Company, Stamford, Conn., a corporation of Delaware
Filed Dec. 4, 1961, Ser. No. 156,817
2 Claims. (Cl. 250—216)

This invention relates to an improved detector system especially for the infrared.

There are many detectors which transform optical radiations into electrical signals. In the visible spectrum there are a number of highly sensitive detectors and the problems which the present invention solves are less acute, although detectors operating in the visible spectrum are not excluded from the present invention. In the infrared, and particularly in rather long range infrared, the detectors are not as sensitive and often the radiation intensity is low. This is particularly true with thermistor bolometers in which detection is effected by a thermistor or similar element which changes resistance with temperature. Similarly, photoconductors, in which the resistance change results from photons of the incoming radiation, also present the same problem of limited sensitivity. As a result, many instruments operate very near to the limit set by noise and other factors and so an increase in the sensitivity of the radiation detector is of great importance. In some cases it may render a type of instrument suitable for a certain use whereas formerly there would have been insufficient sensitivity.

One factor relative to sensitivity is determined by the size of the radiation detecting element (the flake in the case of a thermistor bolometer). In general, other things being kept equal, the response of a detector varies inversely as the square root of its area. This puts a premium on small detectors and has resulted in the common use of so-called immersed detectors in which the detector element is in optical contact, or "immersed" in a lens. When a hemispherical lens is used, that is to say one in which the detector element is centered on the rear surface of the lens at its center of curvature, increases in detector sensitivity approaching the refractive index of the lens material are obtained. With hyperimmersed detectors, that is to say detectors in optical contact or immersed on a lens at a point beyond the center of curvature of the lens surface with suitable design of the other elements of the optical system, it is possible to obtain gains in detector sensitivity even greater than the refractive index of the lens material. Immersed thermistor bolometers have, therefore, achieved an important place in instrumentation and one that is rapidly growing. Typical immersed thermistor bolometers are those described in the patents to Wormser 2,983,888, May 9, 1961, and DeWaard 2,994,053, July 25, 1961. In the infrared, when wavelengths longer than $1.8\mu$ are encountered, it is common to use germanium lenses in immersed detectors where the very high refractive index of germanium, 4, permits impressive gains in sensitivity of the detector.

Immersed bolometers, in spite of their great practical value, still have certain drawbacks. First they require a number of elements in the optical collecting system of the instrument in which they are used. Thus, in addition to the collecting optics proper, which may be dioptric or catoptric, a field stop, and field lens is sometimes required and, of course, the bolometer itself involves a lens and the radiation detector proper. The field lens is an essential feature in almost all optical systems for radiometers where it is necessary that the whole entrance pupil of the instrument be imaged on the detector to avoid problems encountered with detector nonuniformity and to provide for maximum energy utilization.

The second drawback lies in the nature of the immersion optics themselves. When it is desired to obtain maximum gain by using lens materials of very high refractive index such as germanium, reflection losses result. It is true that satisfactory antireflection coatings are known but such coatings are useful only over a limited wavelength range and are, therefore, not suitable for instruments which must be used over a very wide wavelength range, these reflection losses constitute a serious factor.

The third drawback, which is also accentuated when the instrument is required to operate over a wide wavelength range, is a chromatic phenomenon. While germanium changes its refractive index very little with wavelengths substantially longer than its cutoff frequency it is still not achromatic and other lens materials present even worse problems. Another chromatic phenomenon is that of absorption bands. This may be quite serious with lenses made of silicon and even germanium begins to show defective transmissions at very long wavelengths. The present invention permits the production of instruments using detectors of enhanced sensitivity while eliminating or minimizing some or all of the drawbacks to ordinary immersed bolometers.

In the present invention, the increased detector sensitivity is obtained by purely catoptric means. While the mechanism is not the same as in an immersed detector, the results are very similar, that is to say the energy within a given optical field is concentrated over a much smaller detector area. Thus the present invention utilizes what might be called a catoptric analog of immersion. While the results are similar, the mechanism requires entirely different considerations and operating principles than is the case in an ordinary immersed bolometer.

Essentially, the present invention utilizes a highly reflective truncated cone with the radiation detector mounted at the truncation. Relatively precise combinations of cone angles and locations are required in order to achieve the advantages of the present invention. As will be pointed out below when the cone angle is reduced it is possible to reduce the detector size for a given field and hence increase its sensitivity. However there are very definite practical limits because cones of very small angles will have to be inordinately long to achieve a reasonable aperture. Practical instruments require certain limitations on maximum length and when such a limitation is fixed it will be found that there will be an optimum cone angle or small range of cone angles which give the best overall results.

Figure 1:
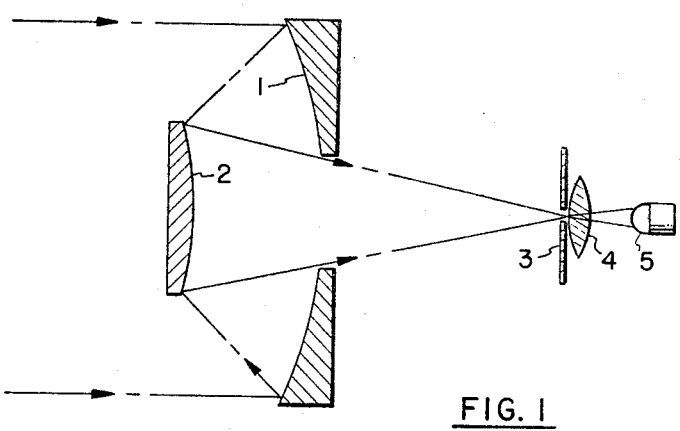
FIG. 1 is a diagrammatic section through an ordinary optical system containing a field lens and an immersed detector.

FIG. 1 shows the ordinary optical setup of an instrument using an immersed bolometer. The collecting optics is illustrated as a typical Cassegrain system with primary mirror 1 and secondary mirror 2, a field mask 3, field lens 4 and immersed detector 5. The detector comprises two kinds of elements, an immersion lens and the detector elements proper. When the lens is a conductor as in the case of germanium, an insulating layer is a third element. Considering the collecting optics as a single element it will be noted that the system requires at least five elements; collecting optics, field stop, field lens, immersion lens and detector.

Figure 2:
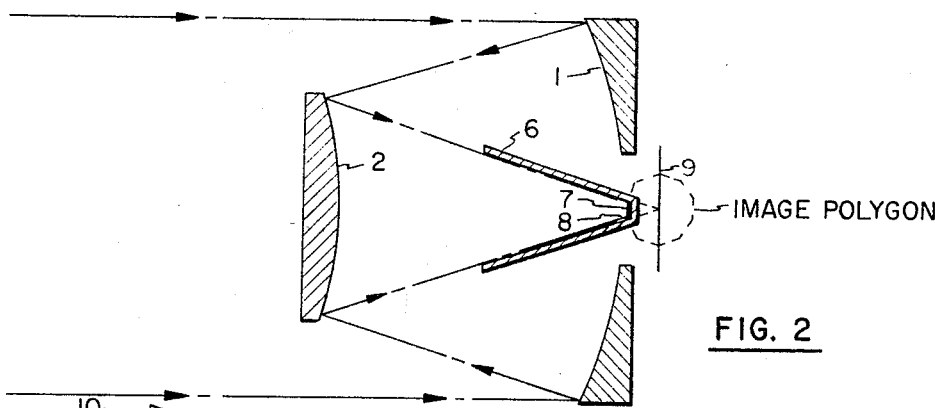
FIG. 2 is a similar diagrammatic section through the optics and detector of the present invention.

FIG. 2 illustrates a similar instrument utilizing the present invention. The same elements bear the same reference numerals. The Cassegrain collecting optics are the same as in FIG. 1 and are typical of a common design of collecting optics. Instead of the field mask, field lens and immersed detector there is a truncated cone 6 with a highly reflective innersurface, a detector flake 7 being mounted at the truncation 8. The cone illustrated effects a similar increase in sensitivity, that is to say, a similar decrease in detector area as in FIG. 1. It will be noted that instead of five elements there are now only three. The cone has taken the place of the field stop, field lens and immersion lens. The same function is performed, therefore, with fewer elements or, looking at it another way, by substituting the cone, the field mask and field lens have been eliminated but their functions are still being performed. Thus the first drawback to ordinary immersed detector instruments, namely relatively large number of elements, is greatly reduced.

The second drawback is also greatly reduced because the losses from reflection of lenses and imperfect focusing with changes in wavelength are reduced or eliminated. It is possible to produce reflecting surfaces of very high reflectivity so that losses are but a very small fraction of those encountered in lenses even with the best antireflection coatings.

The third drawback, nonuniformity of transmission with changing wavelength, is, of course, completely eliminated, since the cone is completely achromatic. All three of the drawbacks to the ordinary immersed detectors are therefore greatly reduced or eliminated.

As stated above it should be understood that the present invention cannot use any cone placed anywhere in the optical system. On the contrary certain definite, but structurally quite simple, limitations must be observed. First, of all the cone must be truncated and the point of truncation is of importance in determination of the amount of detector sensitivity increase. Secondly the cone must be accurately located in the optical path through the system. The latter is simply expressed by stating that the cone must be so located that its apex (if it had not been truncated), coincides or lies in the focal plane of the collecting optics. This is clearly illustrated in FIG. 2 where the apex of the cone, in dashed lines, is shown as located in the focal plane 9. This requirement, while necessary, presents no mechanical problems with a catoptric system because the focal plane remains in the same position regardless of wavelength.

Figure 3:
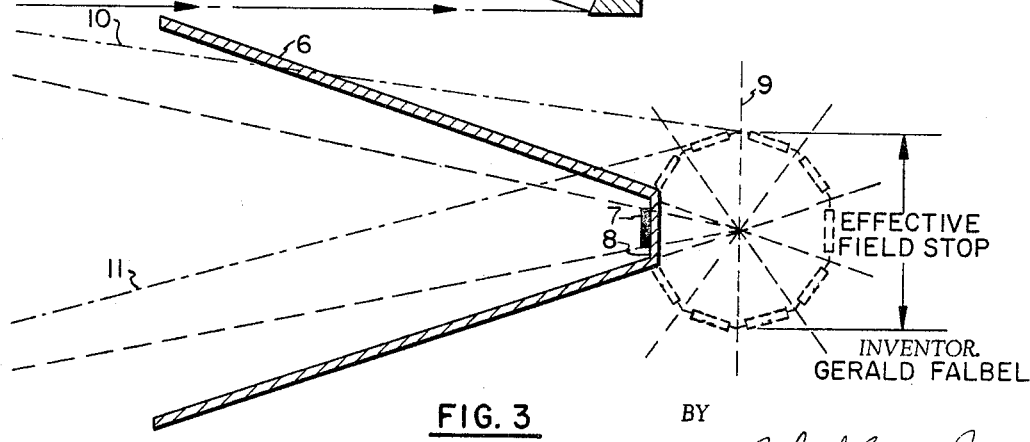
FIG. 3 is an enlarged detail of the cone and detector.

There are additional very important relationships in the cone. The point at which the truncation, or rather detector elements location, occurs defines a regular polygon the center of which is at the apex of the cone. This polygon is referred to as an image polygon and is clearly shown in FIGS. 2 and 3. The designation is apt, since a ray produced straight through the body of the cone which encounters the image polygon is physically reflected onto the detector. This is clearly brought out in FIG. 3 where the prolongation of two of such rays 10 and 11 is shown. The radius of the circumscribed circle around the image polygon constitutes the field stop of the system as is shown in FIG. 3. As a result, the cone not only performs a function analogous to the immersion lens but it also constitutes or results in an effective field stop.

The reduction in size of detector area is measured by the ratio between a side of the image polygon and the diameter of its circumscribed circle. This is influenced physically by two factors in cone design, namely cone angle and point at which truncation is effected and the detector mounted. The smaller the cone angle and the further down from the apex that truncation is effected the greater the ratio. However, there are very practical limits to how great the ratio can be made. First of all there must be a substantial area of cone left below the truncation and if the cone has a fairly large apex angle, there will be insufficient reflecting surface. The cone angle must be less than 90° or no gain results. Also, the cone angle should not be much greater than that corresponding to the dimensions of ray bundle from the collecting optics. For example in FIG. 2 there is shown the maximum cone angle which still receives all of the energy from the secondary Cassegrain mirror. If a very high ratio between image polygon diameter and side is needed, the cone angle must be smaller but there are limits to this. Many instruments require a certain minimum field of view. It is also impractical to use cones of excessive length as an instrument must normally be designed for certain maximum dimensions. When this fixes the maximum length cone efficiency decreases if the cone angle gets too small because at these small angles the decrease in instrument aperture is approximately a square function, the difference between two tangent squares, while the gain approximates a linear function, as far as image polygon is concerned. These considerations set the practical lower limit of cone angle. As a result in practical instruments a ratio of image polygon radius to detector flake radius should not materially exceed about 12 to 15. These, however, represent detector sensitivity increases which compare favorably with the best hyperimmersion lenses and which, of course, eliminate the serious problems of lens reflection.

The description of the present invention has been with an all catoptric system. In the infrared this presents so many advantages that it is distinctly preferred. However, the invention is not absolutely limited to catoptric collecting optics. It is possible to use dioptric optics such as a lens objective where either the wavelength range is narrow or where other considerations of compactness make a catadioptric instrument desirable. Such instruments are, therefore, included in a broad aspect of the present invention.

Certain instruments do not use collecting optics and this is entirely feasible with the detector systems of the present invention. In such a case the base of the cone serves as an entrance pupil to the system. All of the advantages which have been set out before are obtained and so collecting optics are not absolutely required though for many instruments they are worthwhile because of the increased energy gain which they permit.

The instruments of the present invention have been illustrated with a detector mounted on the metal end of the truncated cone. This permits the use of detectors with fairly short time constants and is advantageous in many cases, particularly where the detecting system is a thermistor bolometer. It is also possible for certain instruments requiring maximum sensitivity and which can tolerate a relatively long time constant to mount the detector flake on insulating strands such as strands of plastic.

I claim:

1. An instrument for detecting optical radiation from targets comprising in combination and in optical alignment, (a) optical imaging means positioned to produce a real image of the targets substantially in the focal plane of the imaging means, (b) a truncated cone in the optical path between the optical imaging means and the focal plane, the inner surface of said cone being reflective at the wavelength of the radiation to be detected, (c) a radiation detecting element mounted at the truncated end of the cone, (d) the cone angle and cone location being such that the cone apex, if the cone had not been truncated, would be located in the focal plane, and (e) the truncation being chosen so that the diameter of a circle circumscribed about an image polygon centered at the point in the focal plane where the cone apex would have been located if the cone had not been truncated, the sides of the image polygon being equal to the width of the cone truncation, the diameter of said circumscribed circle being large as compared to the length of a polygon side but not more than about fifteen times as large, the diameter of said circumscribed circle, therefore, constituting the field stop for the optical system.

2. An instrument according to claim 1 in which the collecting optics are catoptric.

References Cited by the Examiner

UNITED STATES PATENTS 2,788,708  4/1957  Williamson _____ 250—83.3

FOREIGN PATENTS 227,346  10/1910  Germany.

JEWELL H. PEDERSEN, *Primary Examiner*

T. L. HUDSON, *Assistant Examiner.*